US012489701B2

(12) United States Patent
Padi et al.

(10) Patent No.: US 12,489,701 B2
(45) Date of Patent: Dec. 2, 2025

(54) SYSTEMS AND METHODS TO OPTIMIZE ROUTING IN BGP (BORDER GATEWAY PROTOCOL) NETWORKS

(71) Applicant: AT&T Intellectual Property I, L.P., Atlanta, GA (US)

(72) Inventors: Narayan Padi, Cedar Knolls, NJ (US); Tzuu-Yi Wang, Newtown, PA (US); Harpreet Ahluwalia, Holmdel, NJ (US); Gagan Choudhury, Jackson, NJ (US); Aswatnarayan Raghuram, Morganville, NJ (US); Alvin C. Goddard, Kendall Park, NJ (US); Manu Thannickal, Basking Ridge, NJ (US); Lynn Rivera, Leesburg, VA (US); Sheshashailavas Chinthakayala, Chesterfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 495 days.

(21) Appl. No.: 17/672,320

(22) Filed: Feb. 15, 2022

(65) Prior Publication Data
US 2023/0261967 A1     Aug. 17, 2023

(51) Int. Cl.
*H04L 45/12*     (2022.01)
*H04L 12/46*     (2006.01)
(Continued)

(52) U.S. Cl.
CPC ........ *H04L 45/123* (2013.01); *H04L 12/4641* (2013.01); *H04L 43/0817* (2013.01);
(Continued)

(58) Field of Classification Search
CPC ............... H04L 45/123; H04L 12/4641; H04L 43/0817; H04L 43/0882; H04L 45/22;
(Continued)

(56) References Cited

U.S. PATENT DOCUMENTS

| 10,536,366 B1 * | 1/2020 | Gray | ..................... H04L 45/025 |
| 2003/0118024 A1 * | 6/2003 | Lee | ......................... H04L 45/24 |
| | | | 370/238 |

(Continued)

FOREIGN PATENT DOCUMENTS

CN          104426855 A  *   3/2015

*Primary Examiner* — Abdulkader M Alriyashi
(74) *Attorney, Agent, or Firm* — Guntin & Gust, PLC; Robert Gingher

(57) ABSTRACT

Aspects of the subject disclosure may include, for example, detecting whether a bandwidth capacity loss occurs on a first link bundle connecting one or more first core routers of a core Interior Gateway Protocol (IGP) network with one or more first provider routers, resulting in a detected capacity loss, wherein communication between the one or more first core routers of the core IGP network and the one or more first provider routers utilizes a Border Gateway Protocol (BGP), wherein a second link bundle connects one or more second core routers of the core IGP network with one or more second provider routers, and wherein communication between the one or more second core routers of the core IGP network and one or more second provider routers utilizes the BGP; responsive to the detected capacity loss, automatically increasing a cost associated with selected network traffic that was to be carried between the one or more first provider routers and the one or more first core routers of the core IGP network and that will instead be re-directed for communication via the second link bundle; and causing communication via the second link bundle of the selected network traffic, wherein the communication via the second link bundle of the selected network traffic is between the one or more second provider routers and the one or more second core routers of the core IGP network. Other embodiments are disclosed.

20 Claims, 13 Drawing Sheets

(51) Int. Cl.
    *H04L 43/0817*     (2022.01)
    *H04L 43/0882*     (2022.01)
    *H04L 45/00*     (2022.01)
    *H04L 45/42*     (2022.01)
    *H04L 47/122*     (2022.01)

(52) U.S. Cl.
    CPC .......... *H04L 43/0882* (2013.01); *H04L 45/22* (2013.01); *H04L 45/42* (2013.01); *H04L 47/122* (2013.01)

(58) Field of Classification Search
    CPC ..... H04L 45/42; H04L 47/122; H04L 41/145; H04L 41/16; H04L 41/0816; H04L 43/062; H04L 45/04; H04L 45/24; H04L 45/245; H04L 45/28; H04L 45/50
    See application file for complete search history.

(56) References Cited

U.S. PATENT DOCUMENTS

| | | | |
|---|---|---|---|
| 2012/0230185 A1* | 9/2012 | Yong | H04L 45/247 370/230 |
| 2014/0219103 A1* | 8/2014 | Vasseur | H04L 47/122 370/237 |
| 2021/0250278 A1* | 8/2021 | Malaviya | H04L 45/70 |

* cited by examiner

2201

Detecting, by a processing system including a processor, whether a partial failure occurs on a first physical link between a first portion of a core Interior Gateway Protocol (IGP) network and a first source of traffic, resulting in a detected partial failure, wherein communication between the first portion of the core IGP network and the first source of traffic utilizes a Border Gateway Protocol (BGP), wherein the first portion of the core IGP network is associated with a first plurality of virtual local area networks (VLANs) that are configured for communication via the first physical link, wherein a second portion of the core IGP network is associated with a second plurality of VLANs, wherein the first plurality of VLANs are paired to the second plurality of VLANs, and wherein the second plurality of VLANs are configured for communication via a second physical link between the second portion of the core IGP network and a second source of traffic

↓

2203

Responsive to the detected partial failure, automatically determining by the processing system a subset of the first plurality of VLANs, the subset comprising one or more of the first plurality of VLANs whose traffic is to be moved to the second physical link

↓

2205

Causing communication via the second physical link of the traffic associated with the subset of the first plurality of VLANs

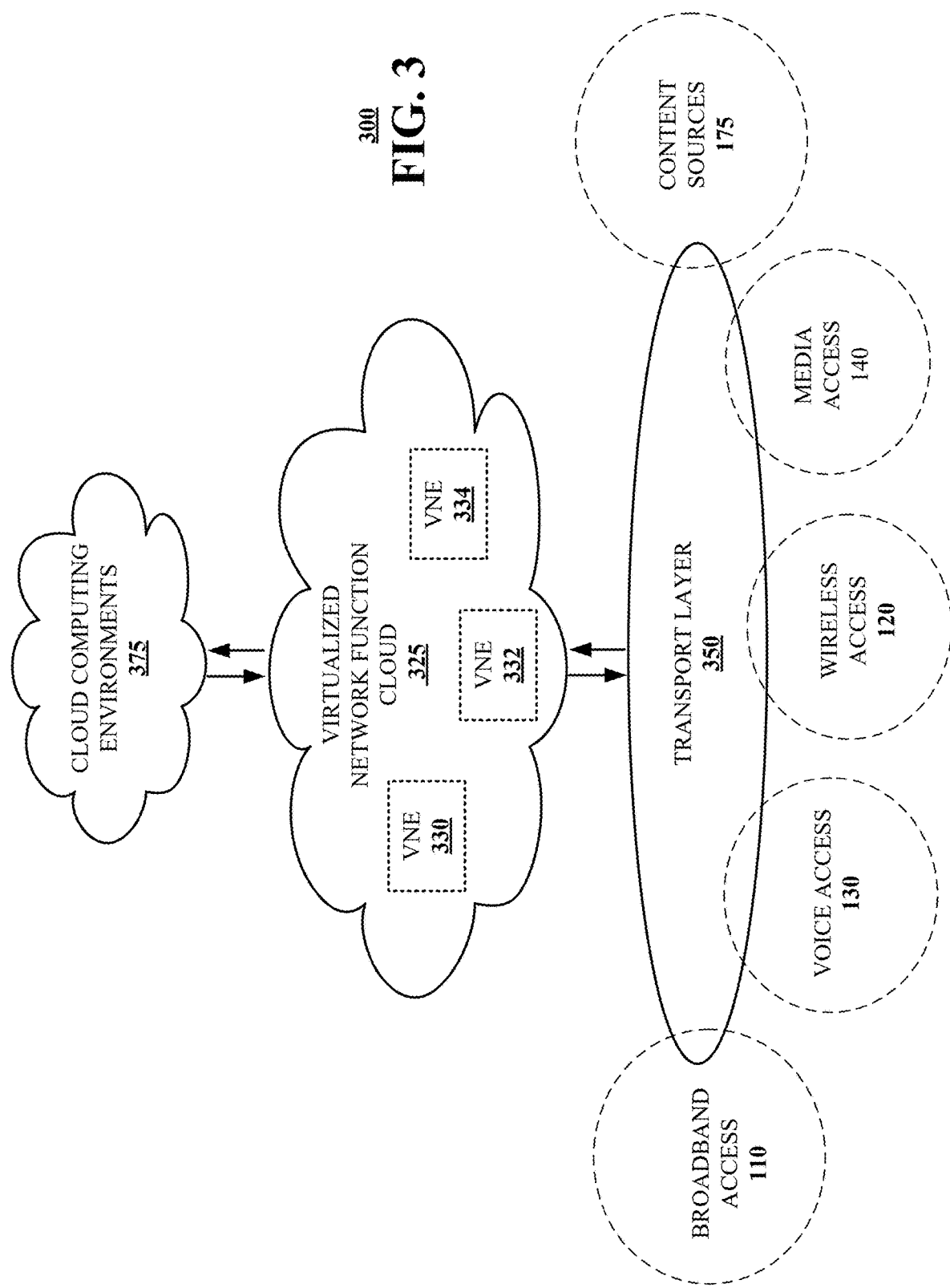

SYSTEMS AND METHODS TO OPTIMIZE ROUTING IN BGP (BORDER GATEWAY PROTOCOL) NETWORKS

FIELD OF THE DISCLOSURE

The subject disclosure relates to systems and methods to optimize routing in BGP (Border Gateway Protocol) networks.

BACKGROUND

When link bundles fail fully in IGP (Interior Gateway Protocol) or BGP networks, conventional routers automatically route the traffic to alternate available paths. When link bundles fail partially in an IGP network, conventional mechanisms such as bandwidth-aware MPLS-TE (Multiprotocol Label Switching-Traffic Engineering) can redirect part of the traffic to an alternate path to avoid traffic loss. However, conventional BGP networks typically do not have such capability in case of partial link bundle failures and so may result in traffic losses (with respect to conventional BGP networks, changes are typically carried out by manually determining capacity change and applying cost changes to the BGP neighbor by logging into the device and using CLI (Command Line Interface) commands).

BRIEF DESCRIPTION OF THE DRAWINGS

Reference will now be made to the accompanying drawings, which are not necessarily drawn to scale, and wherein:

FIG. 2F depicts an illustrative embodiment of a method in accordance with various aspects described herein.

FIG. 3 is a block diagram illustrating an example, non-limiting embodiment of a virtualized communication network in accordance with various aspects described herein.

DETAILED DESCRIPTION

Figure 1:
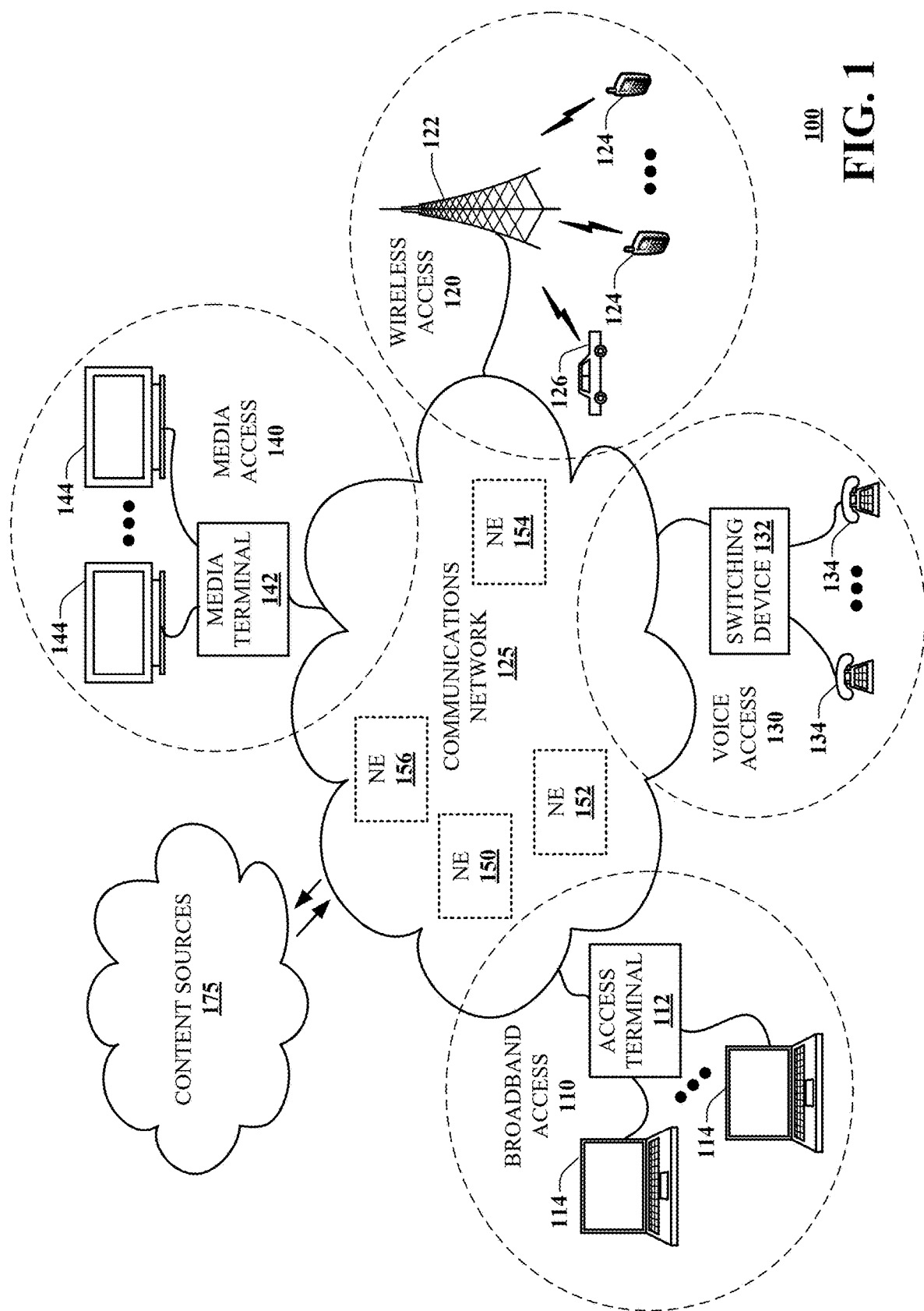
FIG. 1 is a block diagram illustrating an example, non-limiting embodiment of a communication network in accordance with various aspects described herein.

The subject disclosure describes, among other things, illustrative embodiments to optimize routing in Border Gateway Protocol networks. Other embodiments are described in the subject disclosure.

One or more aspects of the subject disclosure include a mechanism that automatically detects (e.g., using telemetry) a capacity loss (e.g., due to a link failure) and increases Accumulated Interior Gateway Protocol (AIGP) cost on the affected link to re-direct all or part of its traffic to one or more alternate BGP neighbors and thereby avoid traffic loss.

One or more aspects of the subject disclosure include a mechanism that: (1) Automatically detects capacity changes and traffic changes on layer 1 optical links connecting separate IGP domains using BGP in real-time using topology telemetry (e.g., the topology capacity, traffic volume, and/or traffic direction) and determines if those capacity changes and/or traffic changes can cause traffic loss on a given link (call this the "affected link"); (2) If it is determined that traffic loss on the affected link is possible, then determine alternate BGP neighbor(s) from the topology telemetry; (3) If the optical link(s) to alternate BGP neighbor(s) have enough capacity to carry their current traffic plus potential re-directed traffic from the affected link then increase the AIGP cost on the affected link so that all or part of such traffic can be re-directed to alternate BGP neighbor(s); (4) When the affected link capacity gets back to its original value (and stays there for some time to assure stability) and it is determined that the affected link can again carry traffic without any losses, revert back the AIGP cost to its original value so that the traffic comes back to the affected link. In various embodiments, the BGP routing policy and AIGP cost changes need to be applied to only one IGP domain and no changes are needed at any other IGP domain (such as can be provided by multiple vendors)—thus resulting in a vendor-agnostic solution.

One or more aspects of the subject disclosure include a device comprising: a processing system including a processor; and a memory that stores executable instructions that, when executed by the processing system, facilitate performance of operations, the operations comprising: detecting whether a bandwidth capacity loss occurs on a first link bundle connecting one or more first core routers of a core Interior Gateway Protocol (IGP) network with one or more first provider routers, resulting in a detected capacity loss, wherein communication between the one or more first core routers of the core IGP network and the one or more first provider routers utilizes a Border Gateway Protocol (BGP), wherein a second link bundle connects one or more second core routers of the core IGP network with one or more second provider routers, and wherein communication between the one or more second core routers of the core IGP network and one or more second provider routers utilizes the BGP; responsive to the detected capacity loss, automatically increasing a cost associated with selected network traffic that was to be carried between the one or more first provider routers and the one or more first core routers of the core IGP network and that will instead be re-directed for communication via the second link bundle; and causing communication via the second link bundle of the selected network traffic, wherein the communication via the second link bundle of the selected network traffic is between the one or more second provider routers and the one or more second core routers of the core IGP network.

One or more aspects of the subject disclosure include a non-transitory machine-readable medium comprising executable instructions that, when executed by a processing system including a processor, facilitate performance of operations, the operations comprising: detecting an amount of a bandwidth capacity loss occurring on a first link bundle connecting one or more first core routers of a core Interior Gateway Protocol (IGP) network with one or more provider routers, resulting in a detected bandwidth loss value, wherein the bandwidth capacity loss is a result of a partial failure of the first link bundle, wherein communication between the one or more first core routers of the core IGP network and the one or more provider routers utilizes a Border Gateway Protocol (BGP), wherein a second link bundle connects one or more second core routers of the core IGP network with the one or more provider routers, and wherein communication between the one or more second core routers of the core IGP network and one or more provider routers utilizes the BGP; responsive to the detected bandwidth loss value, automatically selecting a portion of network traffic that was to be carried between the one or more provider routers and the one or more first core routers of the core IGP network and that will instead be re-directed for communication via the second link bundle; and causing communication via the second link bundle of the portion of the network traffic, wherein the communication via the second link bundle of the portion of the network traffic is between the one or more provider routers and the one or more second core routers of the core IGP network.

One or more aspects of the subject disclosure include a method comprising: detecting, by a processing system including a processor, whether a partial failure occurs on a first physical link between a first portion of a core Interior Gateway Protocol (IGP) network and a first source of traffic, resulting in a detected partial failure, wherein communication between the first portion of the core IGP network and the first source of traffic utilizes a Border Gateway Protocol (BGP), wherein the first portion of the core IGP network is associated with a first plurality of virtual local area networks (VLANs) that are configured for communication via the first physical link, wherein a second portion of the core IGP network is associated with a second plurality of VLANs, wherein the first plurality of VLANs are paired to the second plurality of VLANs, and wherein the second plurality of VLANs are configured for communication via a second physical link between the second portion of the core IGP network and a second source of traffic; responsive to the detected partial failure, automatically determining by the processing system a subset of the first plurality of VLANs, the subset comprising one or more of the first plurality of VLANs whose traffic is to be moved to the second physical link; and causing communication via the second physical link of the traffic associated with the subset of the first plurality of VLANs.

Various embodiments can provide for optimizing and/or otherwise improving routing in BGP networks.

Referring now to FIG. 1, a block diagram is shown illustrating an example, non-limiting embodiment of a system 100 in accordance with various aspects described herein. For example, system 100 can facilitate in whole or in part automatically detecting a capacity loss (e.g., due to a link failure) and increasing an AIGP cost on the affected link to facilitate redirection of all or part of the affected link's traffic to one or more alternate BGP neighbors and thereby avoid traffic loss. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
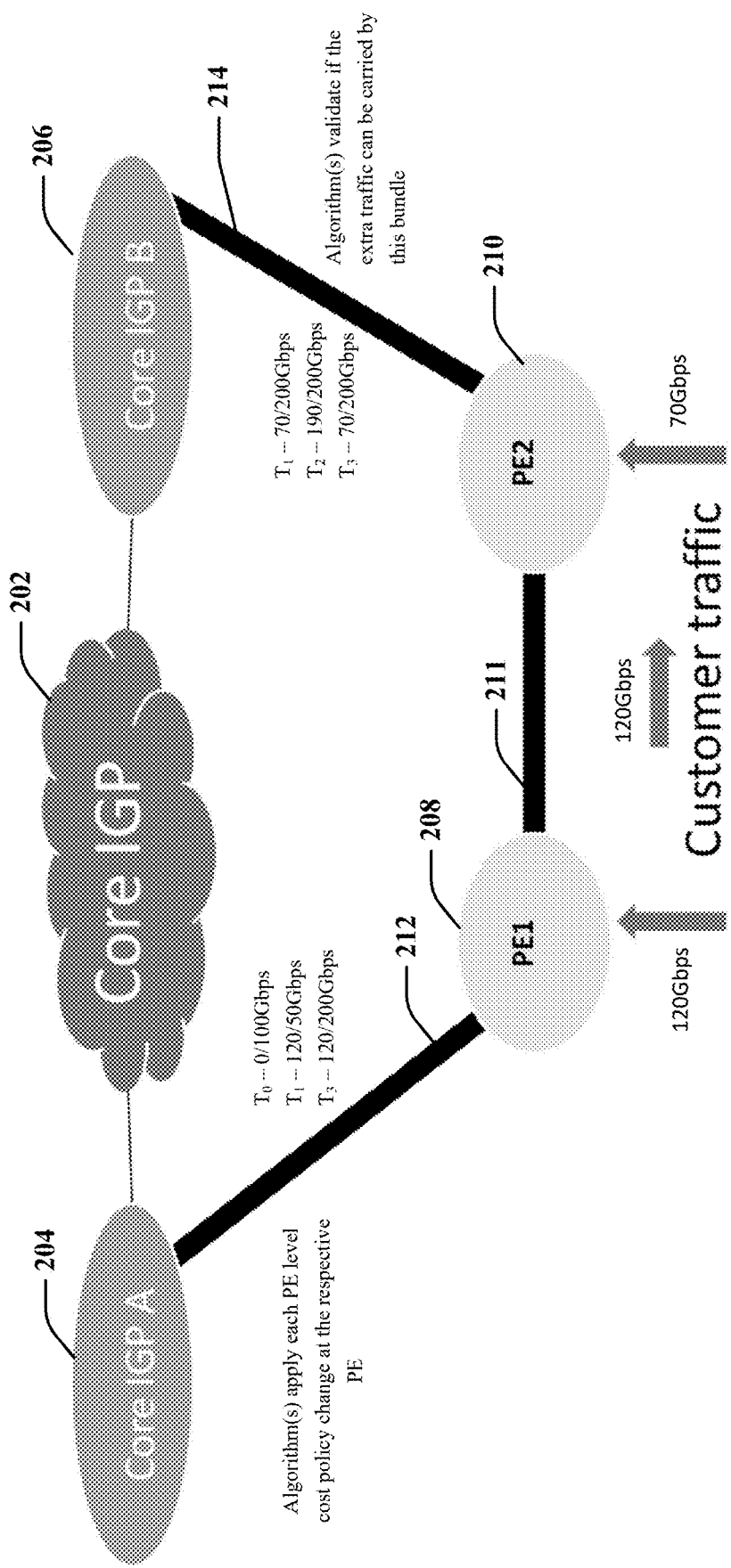
FIG. 2A is a block diagram illustrating an example, non-limiting embodiment of a system (which can function fully or partially within the communication network of FIG. 1) in accordance with various aspects described herein.

Referring now to FIG. 2A, this is a block diagram illustrating an example, non-limiting embodiment of a system 200 (which can function fully or partially within the communication network of FIG. 1) in accordance with various aspects described herein.

In particular, this figure relates to real-time management of partial bundle failures in the context of IGP networks using a "Box Topology". This Box Topology can take the form of a core IGP network 202 having two core IGP routers (shown with call-out numbers 204 and 206) and two provider equipment (PE) elements (shown with call-out numbers 208 and 210). In one example, each of PE 208 and PE 210 can comprise a respective provider equipment router. PE 208 can be in bi-directional communication with one or more respective end user devices (not shown) and PE 210 can be in bi-directional communication with one or more respective end user devices (not shown). PE 208 and PE 210 can be in bi-directional communication with one another via link 211. Link 212 provides for communication between PE 208 and core IGP router 204. Link 214 provides for communication between PE 210 and core IGP router 206. In various examples, link 212 is an uplink bundle comprising a plurality of sub-links and link 214 is an uplink bundle comprising a plurality of sub-links.

As described herein, communication links (such as uplinks connecting IGP networks) can have partial failures which can cause traffic loss. Certain conventionally implemented manual cost changes at PE routers have been used to increase an IGP cost to move traffic to a redundant uplink. However, where certain conventional BGP-LU (Border Gateway Protocol-Labeled Unicast) is used between PE-P segments (such as uplinks), a cost-fallback feature on the router does not exist.

In this regard, various embodiments provide for a mechanism to automate cost policy changes, cost-out, cost-in and/or cost changes on AIGP interfaces, so that traffic loss is reduced or avoided (for the purposes of this discussion, cost-out means increasing cost on AIGP interfaces to near-maximum or maximum value of 65535, cost-in means restoring original cost; any other cost change less than near-maximum or maximum value is also possible for partial traffic movement). In various examples, the mechanism to automate various features can use near-real-time telemetry. In various examples, one or more algorithms can make intelligent failover decisions based on amount of actual traffic flowing on concerned links (and not just based on capacities of such links).

Still referring to FIG. 2A, a description of automated cost-out according to an embodiment will now be provided. More particularly, one or more servers (not shown) continually monitors the bandwidth usage and capacity of Inter IGP uplinks 212 and 214. In one example, the one or more servers can be part of core IGP 202. Further, based on utilization of paired uplinks 212 and 214, one or more algorithms can enable offloading of traffic from an affected bundle by applying relevant AIGP cost policy changes. Further still, after recovery from the failure condition, original costs can be restored (costed-in). In various examples, the redundant uplink can be to the routers in the same or different SNRC (Service Node Routing Complex). In one example, an SNRC can be a location with two routers such that uplink traffic can be alternated to each of these different routers. In another example, the alternate pairs can belong to different location (SNRC) routers. In one example, the algorithm(s) can apply the PE level cost policy change at the appropriate PE.

Still referring to FIG. 2A, a specific (non-limiting) example will now be provided. More particularly, at time $T_0$ link 212 is carrying 0 Gbps of traffic and has the capacity to carry 100 Gbps of traffic. Later, at time $T_1$ PE 208 desires to put 120 Gbps of traffic on link 212; however, due to a partial failure, link 212 now has only 50 Gbps capacity. Further, at time $T_1$ PE 210 is putting 70 Gbps of traffic on link 214 (which has, at that time, 200 Gbps capacity). Thus, at time $T_2$ the 120 Gbps of traffic is re-directed via link 211 from PE 208 to PE 210 (wherein PE 210 then puts the additional 120 Gbps traffic onto link 214 (for a usage of 190 Gbps and a capacity of 200 Gbps)). In one embodiment, before the traffic is re-directed from PE 208 to PE 210, a determination is made (automatically and in a bandwidth-aware manner) whether link 214 has the capacity to accept the additional traffic (if yes, then the re-direction is performed; if no, then a different redundant link (not shown) can be utilized instead). Finally, at a still later time $T_3$, the partial failure on link 212 has been corrected, link 212 now has 200 Gbps capacity, and the 120 Gbps traffic that had been re-directed from PE 208 is no longer re-directed and is instead placed back onto link 212. In another example, each alternate uplink can have similar capacity (e.g., similar starting capacity) to the uplink from which it is receiving traffic.

Figure 2B:
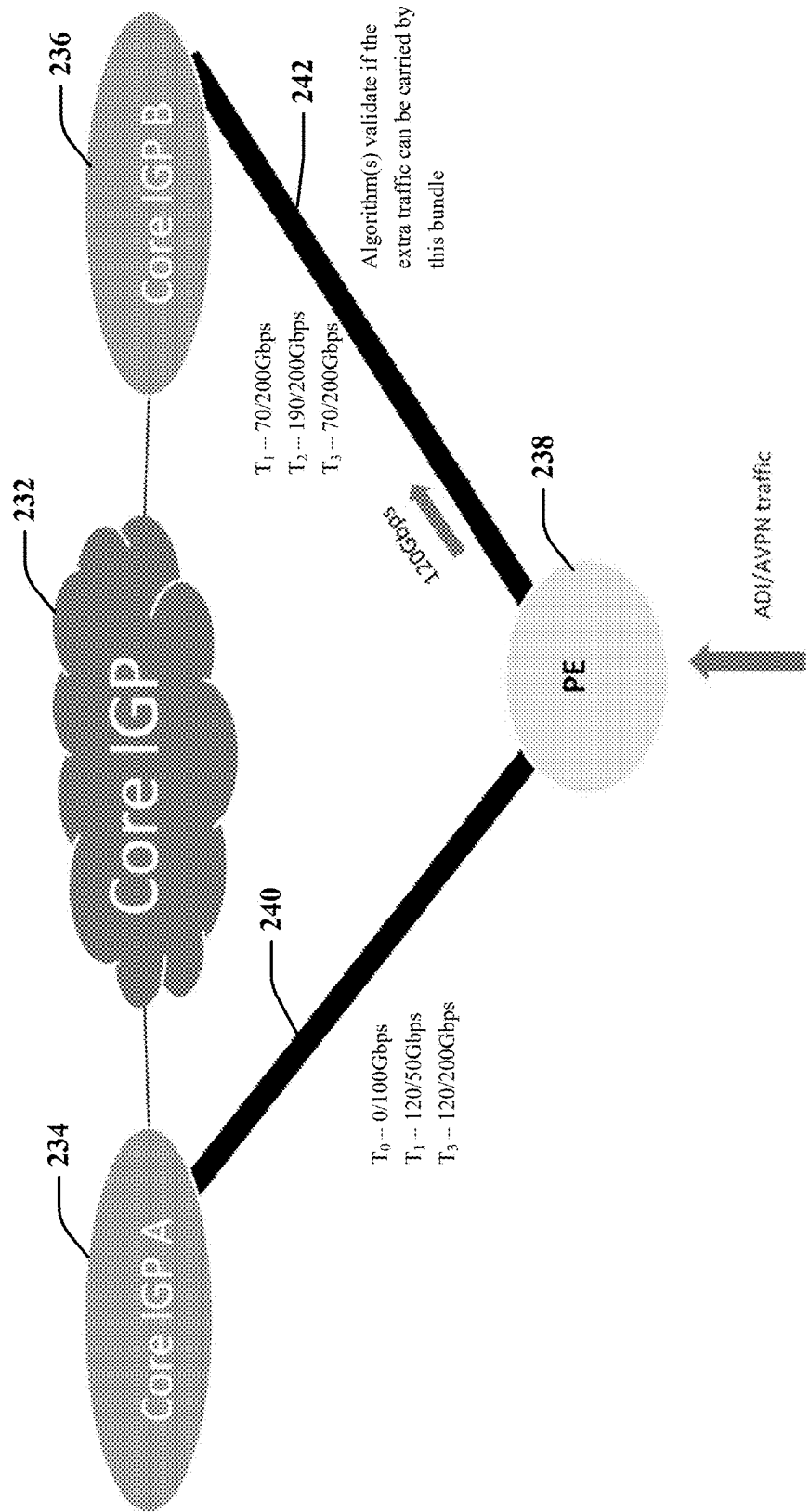
FIG. 2B is a block diagram illustrating an example, non-limiting embodiment of a system (which can function fully or partially within the communication network of FIG. 1) in accordance with various aspects described herein.

Referring now to FIG. 2B, this is a block diagram illustrating an example, non-limiting embodiment of a system 230 (which can function fully or partially within the communication network of FIG. 1) in accordance with various aspects described herein.

In particular, this figure relates to automated PE cost-out in the context of PE and IGP networks using a "Triangle Topology". This Triangle Topology can take the form of a core IGP network 232 having two core IGP routers (shown with call-out numbers 234 and 236) and one provider equipment (PE) element (shown with call-out number 238). In one example, PE 238 can comprise a provider equipment router. PE 238 can receive ADI/AVPN traffic). Link 240 provides for communication between PE 238 and core IGP router 234. Link 242 provides for communication between PE 238 and core IGP router 236. In various examples, link 240 is an uplink bundle comprising a plurality of sub-links and link 242 is an uplink bundle comprising a plurality of sub-links. In various examples, the paired uplink can be to the core IGP router in the same or different SNRC (Service Node Routing Complex). In various respects, this Triangle Topology is similar to the Box Topology discussed above, with the two PEs coalesced to a single PE.

Still referring to FIG. 2B, a specific (non-limiting) example will now be provided. More particularly, at time $T_0$ link 240 is carrying 0 Gbps of traffic and has the capacity to carry 100 Gbps of traffic. Later, at time $T_1$ PE 238 desires to put 120 Gbps of traffic on link 240; however, due to a partial failure, link 240 now has only 50 Gbps capacity. Further, at time $T_1$ PE 238 is putting 70 Gbps of traffic on link 242 (which has, at that time, 200 Gbps capacity). Thus, at time $T_2$ the 120 Gbps of traffic is re-directed via link 242 instead of via link 240 (wherein PE 238 then puts the additional 120 Gbps traffic onto link 242 (for a usage of 190 Gbps and a capacity of 200 Gbps)). In one embodiment, before the traffic is re-directed from PE 238 to link 242, a determination is made (automatically and in a bandwidth-aware manner) whether link 242 has the capacity to accept the additional traffic (if yes, then the re-direction is performed; if no, then a different redundant link (not shown) can be utilized instead). Finally, at a still later time $T_3$, the partial failure on link 240 has been corrected, link 240 now has 200 Gbps capacity, and the 120 Gbps traffic that had been re-directed to link 242 is no longer re-directed and is instead placed back onto link 240.

Reference will now be made to some additional discussion directed to partial movement of traffic during partial failure (e.g., in connection with the Box Topology and Triangle Topology discussed above). As described above, various embodiments can be directed to cost-out (e.g., setting AIGP cost to the maximum or near-maximum value of 65535) of the partially failed link. In various examples, this results in the entire traffic from the partially failed link to be moved to the other (paired) uplink. In other embodiments, it is also possible to increase the AIGP cost of the partially failed uplink by a moderate amount so that only a fraction of the traffic on the partially failed uplink moves to the other uplink. This can be implemented, for example, via an end-to-end network wide simulation to quantify what fraction of the traffic will move as a function of cost change (0% movement with no cost change, 100% movement with maximal cost change, simulation study providing data to identify the impact of any other cost changes). In various examples, a next step can be to identify what fraction of traffic needs to be moved so that the partially failed link can carry the traffic that has not moved, and the other uplink can carry its own traffic plus the traffic that moved away from the partially failed uplink. Further, in various examples, a next step can be to use the simulation study results to set the cost change to the correct value such that the correct fraction of traffic will move. In one example, an iterative process can be used to fine tune the required cost change.

Figure 2C:
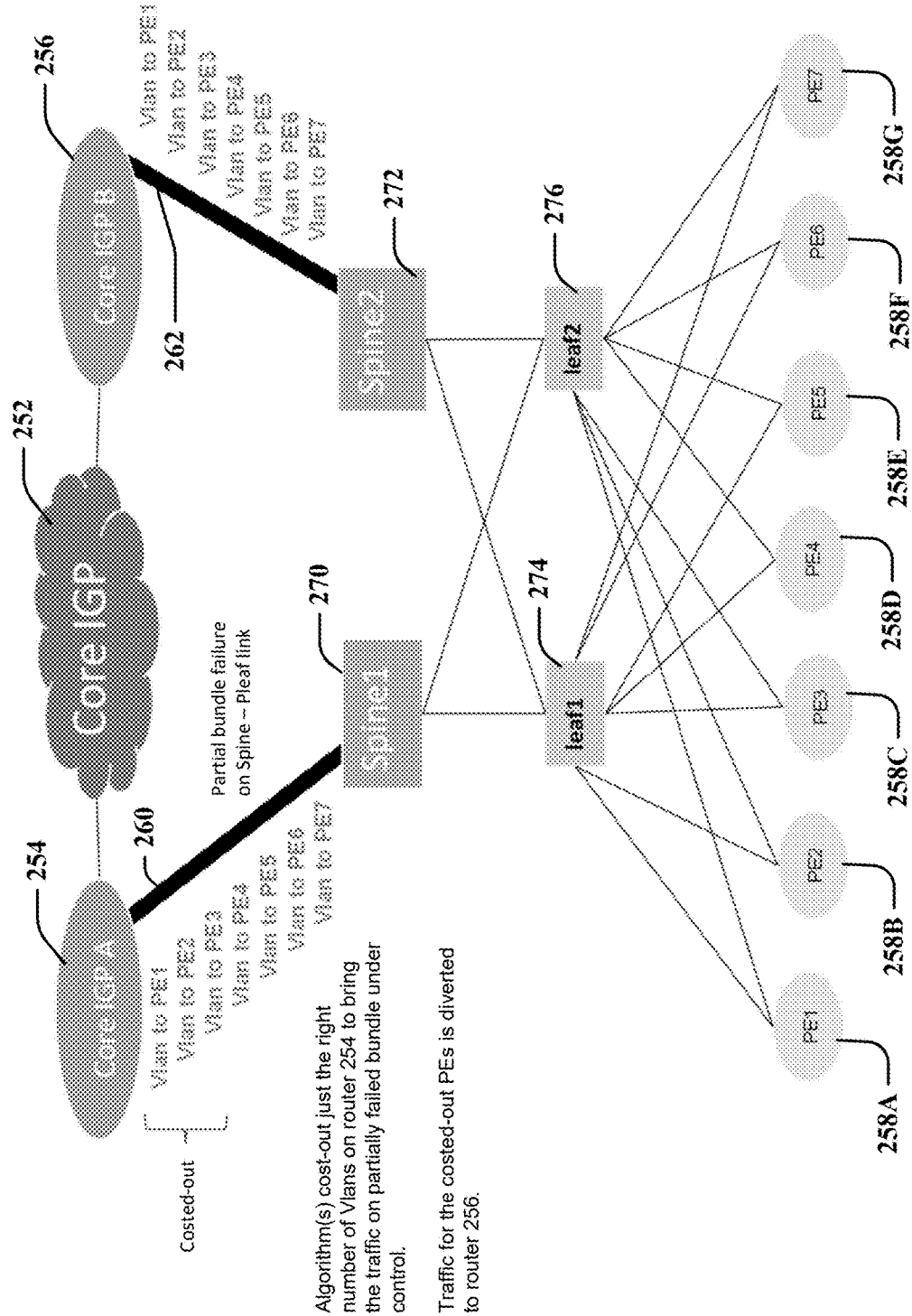
FIG. 2C is a block diagram illustrating an example, non-limiting embodiment of a system (which can function fully or partially within the communication network of FIG. 1) in accordance with various aspects described herein.

Referring now to FIG. 2C, this is a block diagram illustrating an example, non-limiting embodiment of a system 250 (which can function fully or partially within the communication network of FIG. 1) in accordance with various aspects described herein.

In particular, this figure relates to automated PE cost-out in the context of PE(s) to P connected in a 2 tier spine-leaf architecture example (wherein switches can be used to try to avoid local traffic routing through core routers in selected SNRC (e.g., if traffic is between two PEs connected to switches in the same office then traffic only has to route through these spine-leaf switches, not core routers)). The topology of this embodiment can take the form of a core IGP network 252 having two core IGP routers (shown with call-out numbers 254 and 256). A plurality of provider equipment (PE) elements (shown with call-out numbers 258A-258G) are in bi-directional communication with leaf 274 and leaf 276. Each of leaf 274 and leaf 276 can comprise multiple PEs connected over different VLANS (of the same physical link). Further, each of leaf 274 and 276 is in bi-directional communication with spine 270 and 272. Each of spine 270 and 272 can comprise multiple PEs connected over different VLANS (of the same physical link). Link 260 provides for communication between Spine 270 and core IGP router 254. Link 262 provides for communication between Spine 272 and core IGP router 256. In various examples, link 260 is an uplink bundle comprising a plurality of sub-links and link 262 is an uplink bundle comprising a plurality of sub-links. Further, router 254 has associated therewith a plurality of VLANs (Virtual LAN). Each of these VLANS associated with router 254 corresponds to one of PE 258A-258G. Further still, router 256 has associated therewith a plurality of VLANs. Each of these VLANS associated with router 256 corresponds to one of PE 258A-258G. In operation according to an embodiment, in the event of a partial bundle failure on link 260, algorithm(s) cost-out just the right number of VLANS on router 254 to bring the traffic on partially failed bundle under control (in the non-limiting example shown, VLANS to PEs 258A, 258B, and 258C are costed-out). Traffic for the costed-out PEs is diverted to router 256 via link 262.

Reference will now be made to some additional discussion directed to AIGP Partial failure solution algorithm (for instance, in the context of a 2 tier spine-leaf architecture where multiple VLANS connect different PEs) according to an embodiment. More particularly, for paired inter AIGP link with multiple VLANs (see, e.g., FIG. 2C):

Suppose there are V VLANs configured on a physical link L and are paired to V' VLANs configured on physical link L'.

When partial failure is observed in link L, identify a subset $V_i$ of VLANs that may be costed-out such that:
a) Sum of utilization of all VLANs V—sum of utilizations of the subset $V_i$<Congestion threshold on link L
&
b) Sum of utilization of all VLANs V'+sum of utilization of the subset $V_i$<Congestion threshold on Link L'

Algorithm will minimize the subset $V_i$ such that minimum number of VLANs would need to be costed-out.

When the partial failure is restored, it makes sense to wait for some time to make sure that the restoration is stable before reverting the cost changes to bring traffic back to normal state (this will avoid potential movement of traffic back and forth).

Figure 2D:
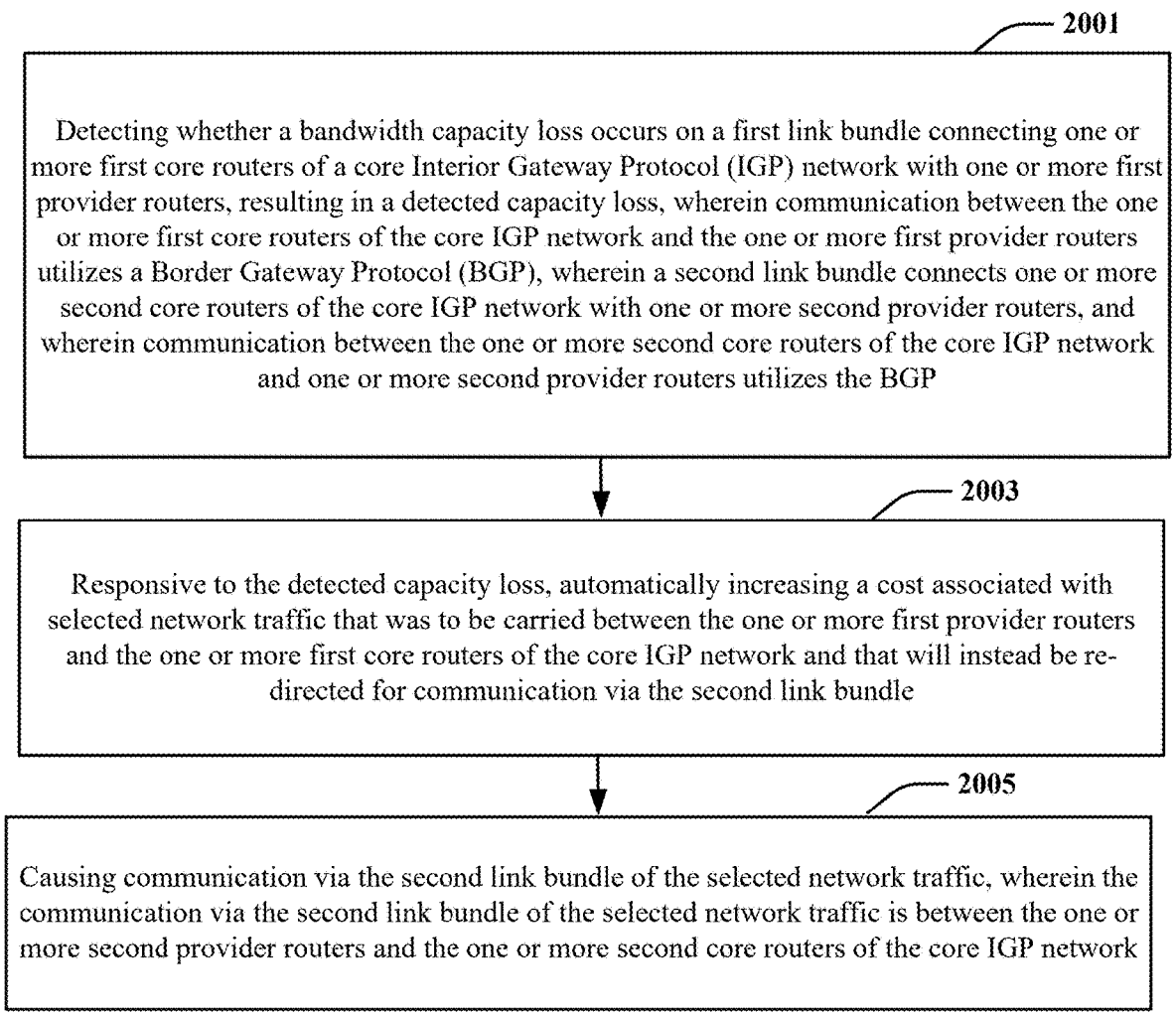
FIG. 2D depicts an illustrative embodiment of a method in accordance with various aspects described herein.

Referring now to FIG. 2D, various steps of a method 2000 according to an embodiment are shown. As seen in this FIG. 2D, step 2001 comprises detecting whether a bandwidth capacity loss occurs on a first link bundle connecting one or more first core routers of a core Interior Gateway Protocol (IGP) network with one or more first provider routers, resulting in a detected capacity loss, wherein communication between the one or more first core routers of the core IGP network and the one or more first provider routers utilizes a Border Gateway Protocol (BGP), wherein a second link bundle connects one or more second core routers of the core IGP network with one or more second provider routers, and wherein communication between the one or more second core routers of the core IGP network and one or more second provider routers utilizes the BGP. Next, step 2003 comprises responsive to the detected capacity loss, automatically increasing a cost associated with selected network traffic that was to be carried between the one or more first provider routers and the one or more first core routers of the core IGP network and that will instead be re-directed for communication via the second link bundle. Next, step 2005 comprises causing communication via the second link bundle of the selected network traffic, wherein the communication via the second link bundle of the selected network traffic is between the one or more second provider routers and the one or more second core routers of the core IGP network.

While for purposes of simplicity of explanation, the respective processes are shown and described as a series of blocks in 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2E:
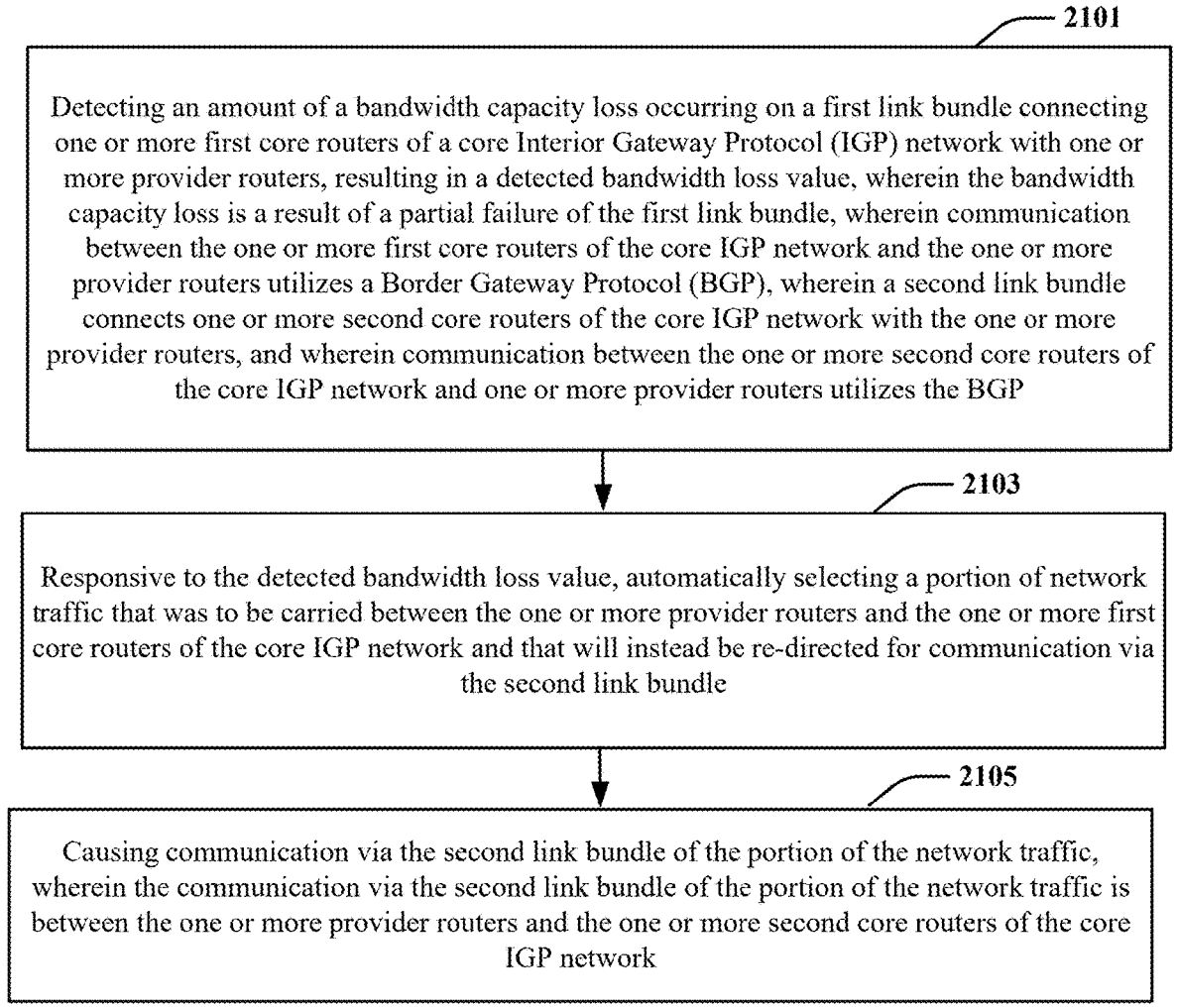
FIG. 2E depicts an illustrative embodiment of a method in accordance with various aspects described herein.

Referring now to FIG. 2E, various steps of a method 2100 according to an embodiment are shown. As seen in this FIG. 2E, step 2101 comprises detecting an amount of a bandwidth capacity loss occurring on a first link bundle connecting one or more first core routers of a core Interior Gateway Protocol (IGP) network with one or more provider routers, resulting in a detected bandwidth loss value, wherein the bandwidth capacity loss is a result of a partial failure of the first link bundle, wherein communication between the one or more first core routers of the core IGP network and the one or more provider routers utilizes a Border Gateway Protocol (BGP), wherein a second link bundle connects one or more second core routers of the core IGP network with the one or more provider routers, and wherein communication between the one or more second core routers of the core IGP network and one or more provider routers utilizes the BGP. Next, step 2103 comprises responsive to the detected bandwidth loss value, automatically selecting a portion of network traffic that was to be carried between the one or more provider routers and the one or more first core routers of the core IGP network and that will instead be re-directed for communication via the second link bundle. Next, step 2105 comprises causing communication via the second link bundle of the portion of the network traffic, wherein the communication via the second link bundle of the portion of the network traffic is between the one or more provider routers and the one or more second core routers of the core IGP network.

While for purposes of simplicity of explanation, the respective processes are shown and described as a series of blocks in 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2F, various steps of a method 2200 according to an embodiment are shown. As seen in this FIG. 2F, step 2201 comprises detecting, by a processing system including a processor, whether a partial failure occurs on a first physical link between a first portion of a core Interior Gateway Protocol (IGP) network and a first source of traffic, resulting in a detected partial failure, wherein communication between the first portion of the core IGP network and the first source of traffic utilizes a Border Gateway Protocol (BGP), wherein the first portion of the core IGP network is associated with a first plurality of virtual local area networks (VLANs) that are configured for communication via the first physical link, wherein a second portion of the core IGP network is associated with a second plurality of VLANs, wherein the first plurality of VLANs are paired to the second plurality of VLANs, and wherein the second plurality of VLANs are configured for communication via a second physical link between the second portion of the core IGP network and a second source of traffic. Next, step 2203 comprises responsive to the detected partial failure, automatically determining by the processing system a subset of the first plurality of VLANs, the subset comprising one or more of the first plurality of VLANs whose traffic is to be moved to the second physical link. Next, step 2205 comprises causing communication via the second physical link of the traffic associated with the subset of the first plurality of VLANs.

While for purposes of simplicity of explanation, the respective processes are shown and described as a series of blocks in 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, for the purpose of reliability, there are traditionally multiple links connecting two IGP domains (wherein each link uses BGP over optical layer, such as where a BGP link is a combination of one or more optical layer wavelengths). If one such link fails completely then the traffic is traditionally moved to a different BGP neighbor (such as by moving to a different link/bundle). However, if there is a partial failure then the conventional BGP mechanism typically does not have the ability to move traffic away partially or completely from the affected link (such as a logical link, or bundle). In contrast, various embodiments provide for one or more of: (a) dynamic detection of capacity losses by listening to the state changes of the layer 1 optical links for BGP neighbors; (2) analyze the traffic utilizations on all available paths and asses if alternate paths can sustain traffic from paths with loss in capacity; (3) upon finding reliable alternate paths, routing policy configurations (using AIGP cost changes) are applied such that traffic can be routed on the healthy alternate paths which can sustain the additional traffic; (4) using intelligent algorithm and controlling AIGP cost to selective BGP neighbors, a subset of traffic (based on parameters such as bandwidth utilization for source destination pairs) can be moved from partially failed link bundles to alternate paths; (5) when layer 1 optical link states are restored, the algorithm waits for some time to avoid link-flipping and to make sure that the capacity is back to a stable state; (6) with the observation of healthy state, the routing policy configurations are reset intelligently allowing either a subset or all of traffic to be moved back on now stable default path; and/or (7) device telemetry is used to get various real-time metrics.

As described herein, various embodiments can provide a real-time bandwidth-usage based closed-loop solution (such solution can enable quick detection and avoidance of congestion in BGP networks that connect multiple IGP domains with multiple links).

As described herein, various embodiments can provide a mechanism wherein policy changes are applied to only one IGP domain in a vendor agnostic manner. In various specific examples, the policy changes can be applied to an IGP-facing side of the link bundles, and the edge router-facing side (e.g., associated with different vendors) need not be changed (wherein, for example, there is no need to pay vendors to provide custom support for these policy changes).

As described herein, various embodiments can provide a mechanism that benefits any entity (e.g., a company) that uses BGP for interconnecting IGP domains with multiple paths.

As described herein, various embodiments can provide a mechanism that: (a) is based on traffic as well as capacity monitoring in real-time; and (b) utilizes algorithmic computations to make sure that the correct level of AIGP cost change is implemented (e.g., to redirect the correct amount of traffic).

As described herein, various embodiments can provide a mechanism to determine how much (and which) traffic should be re-routed from one IGP domain to another other IGP domain (each of which is connected to at least one BGP link) in a case that there is a failure in one of the links. In one specific example, the determination as to how much (and which) traffic should be re-routed is made in the context of a partial failure. In one specific example, the determination as to how much (and which) traffic should be re-routed is based upon knowledge of an available capacity of one or more potential target links.

As described herein, various embodiments can provide a mechanism to determine how much (and which) traffic should be re-routed from one IGP domain to another IGP domain (each of which is connected to at least one BGP link) in a case without knowing the accumulated IGP cost (AIGP) cost on both the source link and the target link (e.g., by knowing the accumulated IGP cost (AIGP) cost on only the source link).

As described herein, various embodiments can provide a mechanism to very quickly detect a failure (e.g., within 60 milliseconds) and then based upon that detected failure very quickly determine how much (and which) traffic should be re-routed (wherein, for example, traffic could be re-routed in matter of milliseconds or seconds).

As described herein, various embodiments can provide a mechanism to selectively determine for a plurality of end user devices (e.g., for one-third or one-fourth of a total number of end-user device), which corresponding network traffic flow to cost-out and re-route (such as to avoid any traffic loss). In one specific example, a maximum AIGP cost can be approximately 65,000 (wherein such maximum value causes all traffic on a given link (or link bundle) to be re-routed) and a below maximum AIGP cost (e.g., 1,000 or 2,000) can cause less than all traffic on a given link (or link bundle) to be re-routed. In one specific example, the bigger the AIGP cost is, the less preferable that particular path (e.g., if there are two paths, one path having a AIGP cost of 100 and the other path having a AIGP cost of 200, then the preferred path would be the path that has a AIGP cost of 100).

As described herein, various embodiments can provide a mechanism to very quickly and automatically detect failure(s) to move part of the traffic flow on one link (or link bundle) to another link (or link bundle).

As described herein, various embodiments can provide a mechanism that is bandwidth aware and that based upon such bandwidth awareness can re-direct traffic from one or more partially failed links to one or more redundant links (e.g., re-direct traffic from one or more uplinks to one or more redundant (other) uplinks). In one specific example, traffic can be re-directed by costing-out traffic of one or more VLANs.

As described herein, various embodiments can provide for detecting of one or more failures very quickly.

As described herein, various embodiments can provide for a fine-grained mechanism (e.g., only move traffic that needs to be moved).

As described herein, various embodiments can provide for moving traffic based upon a unitless cost metric such as AIGP (e.g., wherein a lower cost is better).

As described herein, various embodiments can provide for a mechanism that moves traffic based upon bandwidth (e.g., a mechanism that is bandwidth-aware and that utilizes the known bandwidth to make decisions concerning movement of traffic).

As described herein, various embodiments can provide for automated costing-out (e.g., movement) of certain traffic.

As described herein, various embodiments can provide for real-time automated intelligent traffic management (e.g., management in the context of partial failure of a communication bundle). In one specific example, real-time automated intelligent decisions can be made to move the correct (e.g., optimal) amount of traffic, wherein such moved traffic does not overwhelm the communication link(s) to which the traffic is moved.

As described herein, various embodiments can provide for one or more provider equipment routers to be provider edge routers.

As described herein, various embodiments can provide for a mechanism that automatically detects (e.g., using telemetry) a capacity loss (e.g., due to a link failure) and increases Accumulated Interior Gateway Protocol (AIGP) cost on the affected link to redirect all or part of its traffic to one or more alternate BGP neighbors and thereby avoid traffic loss.

Figure 2G:
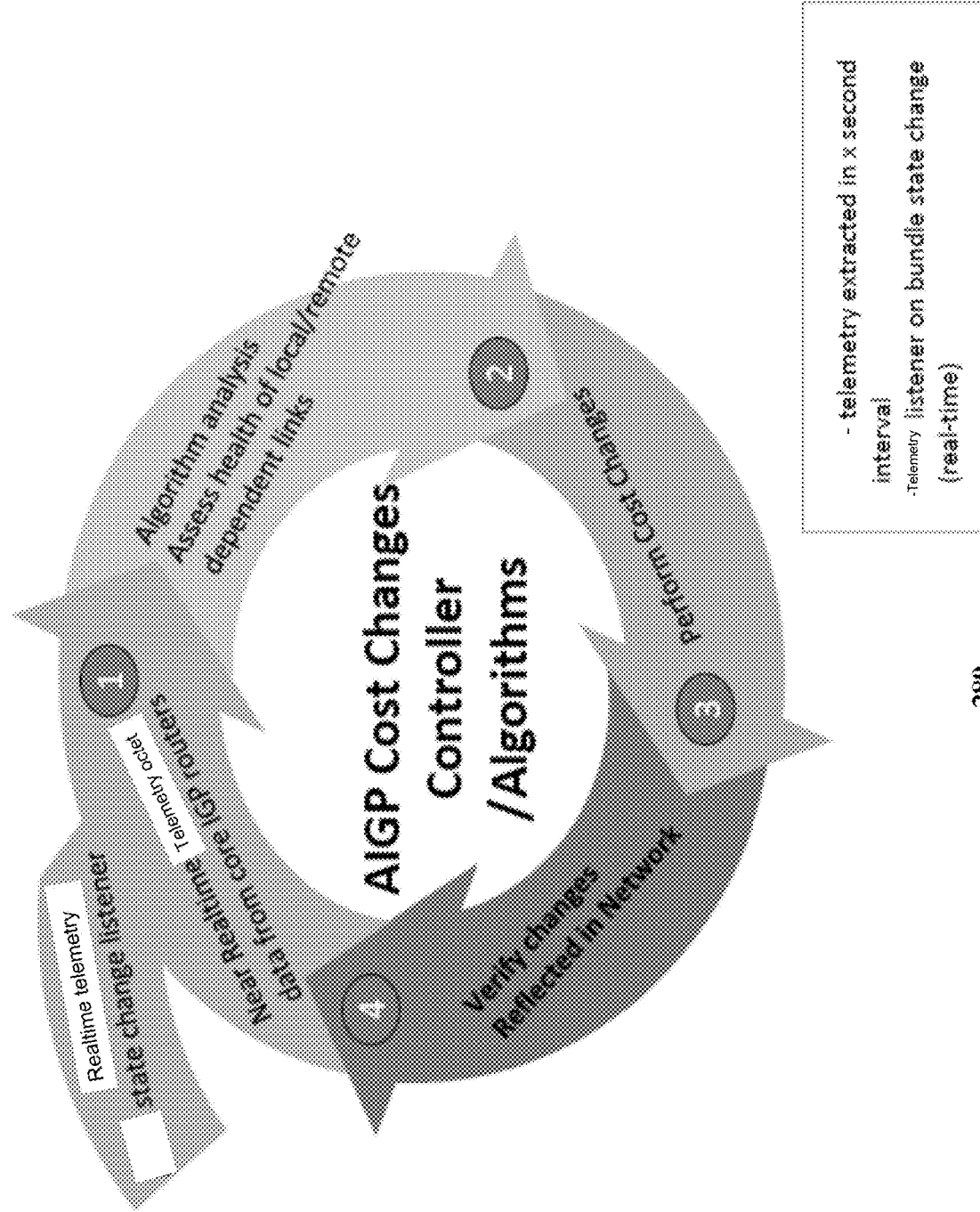
FIG. 2G is a block diagram illustrating an example, non-limiting embodiment of an AIGP cost changes controller/algorithm (which can function fully or partially within the communication network of FIG. 1) in accordance with various aspects described herein.

Referring now to FIG. 2G, this is a block diagram illustrating an example, non-limiting embodiment of an AIGP cost changes controller/algorithm 280 (which can function fully or partially within the communication network of FIG. 1) in accordance with various aspects described herein. As seen in this figure, at step "1" near real-time telemetry octet data can be obtained from core IGP routers (via real-time telemetry state change listener). Further, at step "2" an analysis can be performed to access health of local/remote dependent links. Further still, at step "3" the cost changes can be performed. Further still, at step "4" (which implements a closed-loop solution for partial bundle failures) a verification can be made that the changes are reflected in the network. After step "4", the process can be iterated beginning again at step "1". In one example, the telemetry listener on bundle state change can be real-time and the telemetry can be extracted at a small frequency interval, for example, 60 seconds.

Figure 2H:
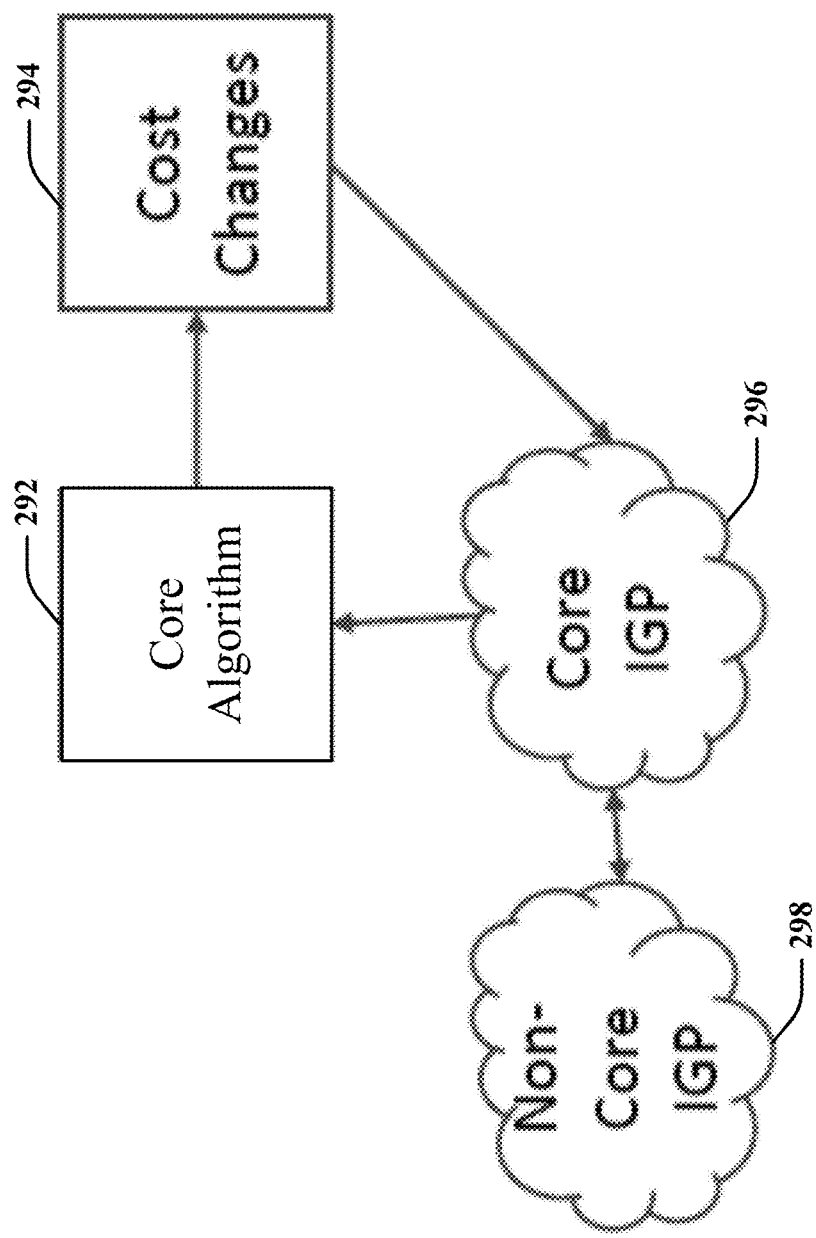
FIG. 2H is a block diagram illustrating an example, non-limiting embodiment of a system (which can function fully or partially within the communication network of FIG. 1) in accordance with various aspects described herein.

Referring now to FIG. 2H, this is a block diagram illustrating an example, non-limiting embodiment of a system 290 (which can function fully or partially within the communication network of FIG. 1) in accordance with various aspects described herein. As seen in this figure, Core Algorithm 292 (which can be configured to carry out various calculations as described herein, such as to implement a closed-loop solution for partial bundle failures) can receive data from Core IGP 296. Core Algorithm 292 can generate Cost Changes 294 as described herein and such Cost Changes 294 can be fed back to Core IGP 296. In addition, Core IGP 296 can be in bi-directional communication with Non-Core IGP 298.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, some or all of the subsystems and functions of system 200, some or all of the subsystems and functions of system 230, some or all of the subsystems and functions of system 250, some or all of method 2000, some or all of method 2100, some or all of method 2200, some or all of the subsystems and functions of system 280, and/or some or all of the subsystems and functions of system 290. For example, virtualized communication network 300 can facilitate in whole or in part automatically detecting a capacity loss (e.g., due to a link failure) and increasing an AIGP cost on the affected link to facilitate redirection of all or part of the affected link's traffic to one or more alternate BGP neighbors and thereby avoid traffic loss.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
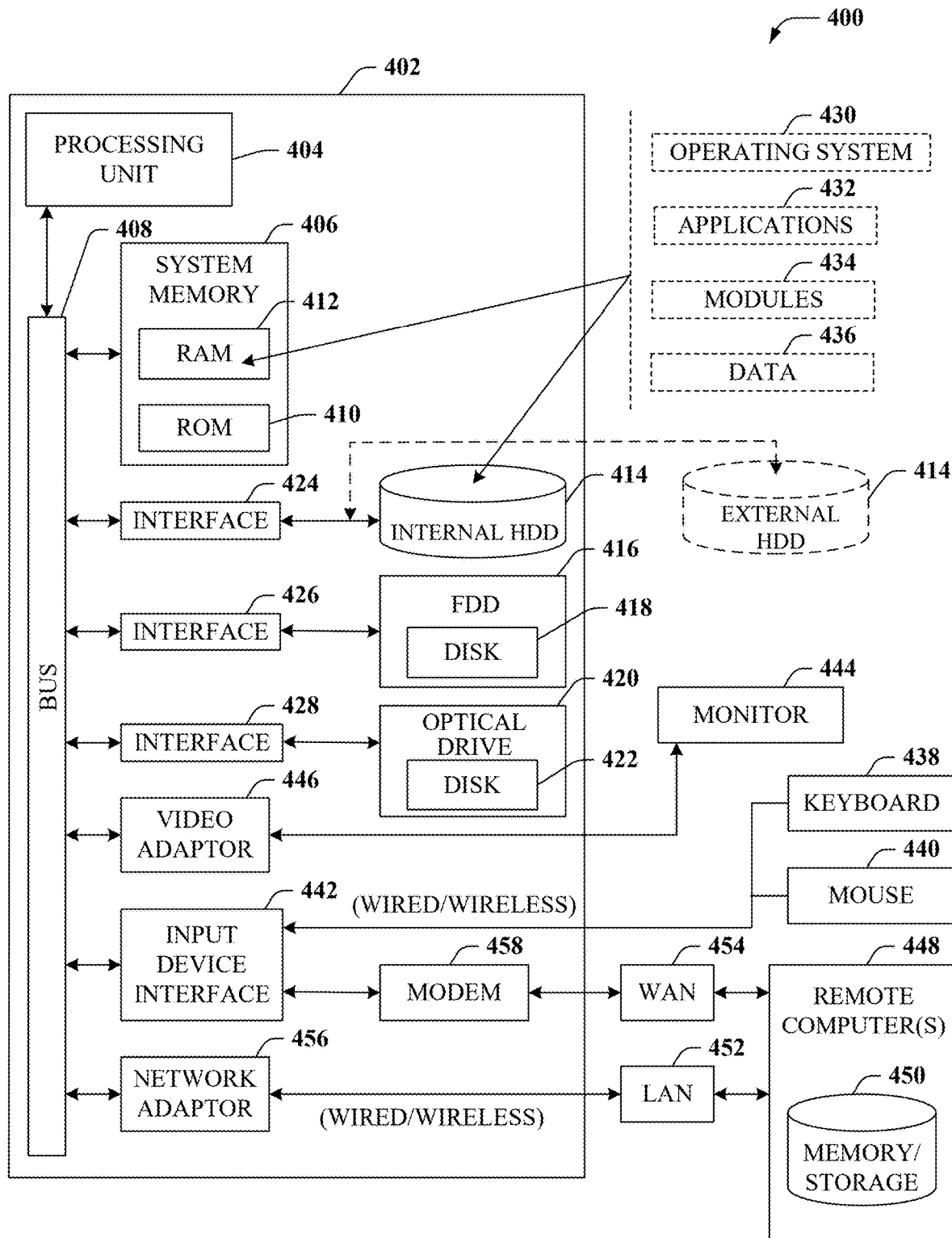
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part automatically detecting a capacity loss (e.g., due to a link failure) and increasing an AIGP cost on the affected link to facilitate redirection of all or part of the affected link's traffic to one or more alternate BGP neighbors and thereby avoid traffic loss.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
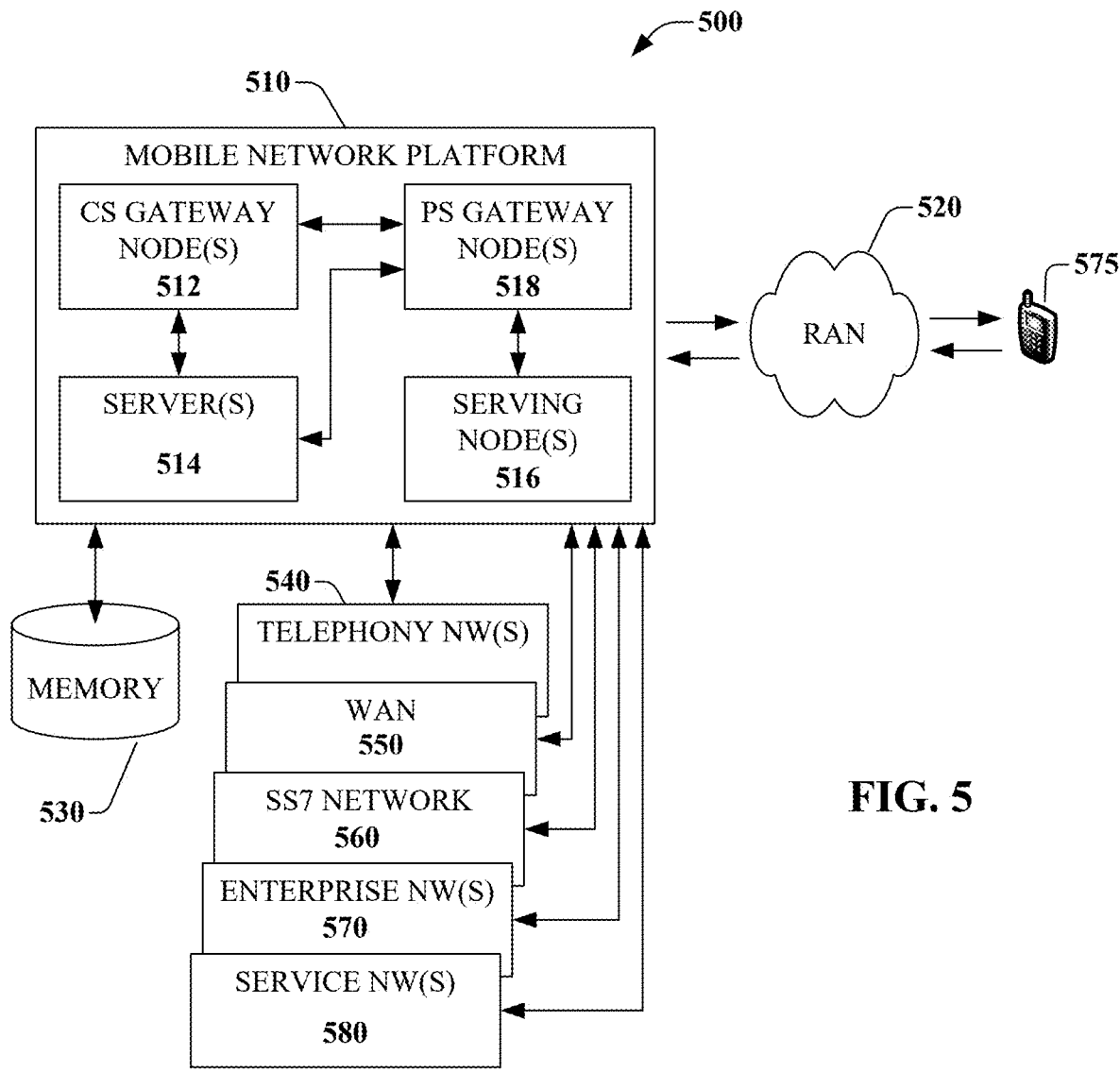
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part automatically detecting a capacity loss (e.g., due to a link failure) and increasing an AIGP cost on the affected link to facilitate redirection of all or part of the affected link's traffic to one or more alternate BGP neighbors and thereby avoid traffic loss. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
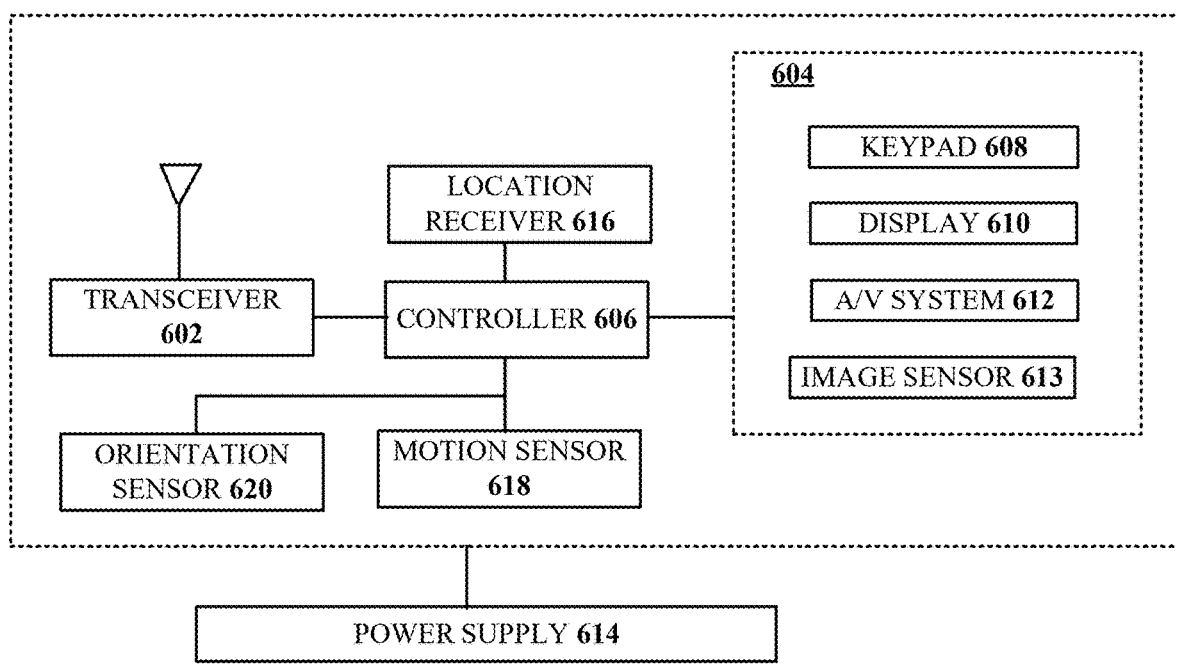
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part automatically detecting a capacity loss (e.g., due to a link failure) and increasing an AIGP cost on the affected link to facilitate redirection of all or part of the affected link's traffic to one or more alternate BGP neighbors and thereby avoid traffic loss.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgment requirements, notifications, selective authorization based on types of data, and so forth.

Some of the embodiments described herein can also employ artificial intelligence (AI) to facilitate automating one or more features described herein. The embodiments (e.g., in connection with automatically detecting a capacity loss (e.g., due to a link failure) and automatically increasing an AIGP cost on the affected link to facilitate redirection of all or part of the affected link's traffic to one or more alternate BGP neighbors) can employ various AI-based schemes for carrying out various embodiments thereof. Moreover, the classifier can be employed to determine a ranking or priority of each link, each traffic flow, and/or each router. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which link, traffic flow, and/or router receives priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:
a processing system including a processor; and
a memory that stores executable instructions that, when executed by the processing system, facilitate performance of operations, the operations comprising:
detecting whether a bandwidth capacity loss occurs on a first link bundle connecting one or more first core routers of a core Interior Gateway Protocol (IGP) network with one or more first provider routers, resulting in a detected capacity loss, wherein communication between the one or more first core routers of the core IGP network and the one or more first provider routers utilizes a Border Gateway Protocol (BGP), wherein a second link bundle connects one or more second core routers of the core IGP network with one or more second provider routers, and wherein communication between the one or more second core routers of the core IGP network and the one or more second provider routers utilizes the BGP, wherein the detecting monitors capacity, traffic volume and traffic direction provided by telemetry information to detect the bandwidth capacity loss;
responsive to the detected capacity loss, automatically increasing an Accumulated IGP cost on the first link bundle associated with selected network traffic that was to be carried between the one or more first provider routers and the one or more first core routers of the core IGP network, wherein the selected network traffic will instead be re-directed for communication via the second link bundle; and
causing communication via the second link bundle of the selected network traffic, wherein the communication via the second link bundle of the selected network traffic is between the one or more second provider routers and the one or more second core routers of the core IGP network.

2. The device of claim 1, wherein:
the first link bundle comprises a plurality of sub-links;
the bandwidth capacity loss is a result of a partial failure; and
the partial failure comprises one or more of the sub-links failing while one or more other ones of the sub-links remain functioning.

3. The device of claim 2, wherein the plurality of sub-links comprises a plurality of optical communication links.

4. The device of claim 3, wherein the plurality of optical communication links comprises a plurality of layer 1 optical communication links and wherein the detecting listens to layer 1 state changes of each of the plurality of optical communication links to detect the bandwidth capacity loss.

5. The device of claim 1, wherein:
the first link bundle comprises a first uplink; and
the second link bundle comprises a second uplink.

6. The device of claim 1, wherein each of the one or more first provider routers and each of the one or more second provider routers is configured for communication with one or more end user devices.

7. The device of claim 1, wherein the selected network traffic is less than all network traffic that was to be carried between the one or more first provider routers and the one or more first core routers of the core IGP network.

8. The device of claim 1, wherein:
the device comprises a centralized system;
the centralized system comprises one or more servers; and
the detecting whether the bandwidth capacity loss occurs is based at least in part upon the telemetry information provided to the centralized system from the one or more first core routers of the core IGP network, the one or more first provider routers, or any combination thereof.

9. The device of claim 8, wherein the causing the communication via the second link bundle is facilitated by transmitting of one or more commands by the centralized system to the one or more first core routers of the core IGP network, the one or more first provider routers, the one or more second core routers of the core IGP network, the one or more second provider routers, or any combination thereof.

10. A non-transitory machine-readable medium comprising executable instructions that, when executed by a processing system including a processor, facilitate performance of operations, the operations comprising:
detecting an amount of a loss of bandwidth capacity occurring on a first link bundle connecting one or more first core routers of a core Interior Gateway Protocol (IGP) network with one or more provider routers, resulting in a detected bandwidth loss value, wherein the loss of the bandwidth capacity is a result of a partial failure of the first link bundle, wherein communication between the one or more first core routers of the core IGP network and the one or more provider routers utilizes a Border Gateway Protocol (BGP), wherein a second link bundle connects one or more second core routers of the core IGP network with the one or more provider routers, and wherein communication between the one or more second core routers of the core IGP network and the one or more provider routers utilizes the BGP, wherein the detecting monitors capacity, traffic volume and traffic direction provided by telemetry information to detect the amount of the loss of bandwidth capacity;
responsive to the detected bandwidth loss value, automatically increasing an Accumulated IGP cost on the first link bundle and selecting a portion of network traffic that was to be carried between the one or more provider routers and the one or more first core routers of the core IGP network, wherein the portion of network traffic will instead be re-directed for communication via the second link bundle; and
causing communication via the second link bundle of the portion of the network traffic, wherein the communication via the second link bundle of the portion of the network traffic is between the one or more provider routers and the one or more second core routers of the core IGP network.

11. The non-transitory machine-readable medium of claim 10, wherein the selecting is responsive to the Accumulated IGP cost meeting a threshold value.

12. The non-transitory machine-readable medium of claim 10, wherein the operations further comprise:
detecting that at least some of the bandwidth capacity that had been lost on the first link bundle has been replaced on the first link bundle; and
responsive to the detecting that at least some of the bandwidth capacity has been replaced, causing a ceasing of communication of the portion of the network traffic on the second link bundle.

13. The non-transitory machine-readable medium of claim 12, wherein:
responsive to the detecting that at least some of the bandwidth capacity has been replaced, causing a reinstating of communication of the portion of the network traffic on the first link bundle.

14. A method comprising:
detecting, by a processing system including a processor, whether a bandwidth capacity loss occurs on a first link bundle connecting one or more first core routers of a core Interior Gateway Protocol (IGP) network with one or more first provider routers, resulting in a detected capacity loss, wherein communication between the one or more first core routers of the core IGP network and the one or more first provider routers utilizes a Border Gateway Protocol (BGP), wherein a second link bundle connects one or more second core routers of the core IGP network with one or more second provider routers, and wherein communication between the one or more second core routers of the core IGP network and the one or more second provider routers utilizes the BGP, wherein the detecting monitors capacity, traffic volume and traffic direction provided by telemetry information to detect the bandwidth capacity loss;
responsive to the detected capacity loss, automatically increasing, by the processing system, an Accumulated IGP cost on the first link bundle associated with selected network traffic that was to be carried between the one or more first provider routers and the one or more first core routers of the core IGP network, wherein the selected network traffic will instead be re-directed for communication via the second link bundle; and
causing, by the processing system, communication via the second link bundle of the selected network traffic, wherein the communication via the second link bundle of the selected network traffic is between the one or more second provider routers and the one or more second core routers of the core IGP network.

15. The method of claim 14, wherein:
the first link bundle comprises a plurality of sub-links;
the bandwidth capacity loss is a result of a partial failure; and
the partial failure comprises one or more of the sub-links failing while one or more other ones of the sub-links remain functioning.

16. The method of claim 15, wherein the plurality of sub-links comprises a plurality of optical communication links.

17. The method of claim 16, wherein the plurality of optical communication links comprises a plurality of layer 1 optical communication links and wherein the detecting listens to layer 1 state changes of each of the plurality of optical communication links to detect the detected capacity loss.

18. The method of claim 14, wherein:
the first link bundle comprises a first uplink; and
the second link bundle comprises a second uplink.

19. The method of claim 14, wherein each of the one or more first provider routers and each of the one or more second provider routers is configured for communication with one or more end user devices.

20. The method of claim 14, wherein the selected network traffic is less than all network traffic that was to be carried between the one or more first provider routers and the one or more first core routers of the core IGP network.

* * * * *